US012565169B2

(12) United States Patent　　　　(10) Patent No.:　US 12,565,169 B2

Ismail et al.　　　　　　　　　　　(45) Date of Patent:　　Mar. 3, 2026

(54) GRILLE GUARD CONFIGURED TO CONVERT INTO A VEHICLE-MOUNTED BENCH

(71) Applicant: FCA US LLC, Auburn Hills, MI (US)

(72) Inventors: Mohammed A Ismail, Lake Orion, MI (US); Dan M Zimmermann, West Bloomfield, MI (US); Mark C Trostle, Bloomfield Hills, MI (US); Ray Murawski, Imlay City, MI (US)

(73) Assignee: FCA US LLC, Auburn Hills, MI (US)

( * ) Notice: Subject to any disclaimer, the term of this patent is extended or adjusted under 35 U.S.C. 154(b) by 381 days.

(21) Appl. No.: 18/308,709

(22) Filed: Apr. 28, 2023

(65) Prior Publication Data

US 2024/0359650 A1　　　Oct. 31, 2024

(51) Int. Cl.
B60R 19/52　　　　　(2006.01)

(52) U.S. Cl.
CPC ................................... B60R 19/52 (2013.01)

(58) Field of Classification Search
CPC ...................................................... B60R 19/52
See application file for complete search history.

(56) References Cited

U.S. PATENT DOCUMENTS

| 2,612,207 | A | * | 9/1952 | Branson | ............... | B60N 2/3095 |
| | | | | | | 297/331 |
| 4,099,760 | A | * | 7/1978 | Mascotte | ............... | B62D 43/02 |
| | | | | | | 224/507 |
| 4,125,214 | A | * | 11/1978 | Penn | ......................... | B60R 9/06 |
| | | | | | | 224/508 |
| 6,447,032 | B1 | * | 9/2002 | Howell, Sr. | ............. | B60R 19/52 |
| | | | | | | 224/489 |
| 9,505,364 | B1 | * | 11/2016 | Schulzetenberg | ...... | B60R 19/52 |
| 10,906,489 | B2 | | 2/2021 | Drever | | |
| 10,926,705 | B2 | * | 2/2021 | Hoffman | .................... | B60R 5/02 |
| 11,230,241 | B2 | * | 1/2022 | Drever | .................... | B60R 19/52 |
| 11,760,290 | B2 | * | 9/2023 | Harding | .................. | B60R 19/54 |
| | | | | | | 293/115 |
| 11,912,219 | B2 | * | 2/2024 | Mitchell, Jr. | ............ | B60N 2/32 |
| 2009/0033125 | A1 | | 2/2009 | Ayabe et al. | | |
| 2009/0212581 | A1 | * | 8/2009 | Drever | .................... | B60R 19/52 |
| | | | | | | 293/115 |
| 2014/0339837 | A1 | * | 11/2014 | Hermann, III | .......... | B66D 1/00 |
| | | | | | | 293/133 |
| 2024/0010150 | A1 | * | 1/2024 | Harding | .................. | B60R 19/46 |
| 2024/0123930 | A1 | * | 4/2024 | Worthington | ........ | B60N 2/3045 |
| 2024/0140340 | A1 | * | 5/2024 | Lanini | ..................... | B60R 19/52 |

FOREIGN PATENT DOCUMENTS

| FR | 2551403 | A | * | 3/1985 |
| WO | WO-2007-080670 | A1 | | 7/2007 |

* cited by examiner

*Primary Examiner* — Aaron L Lembo
(74) *Attorney, Agent, or Firm* — Jeremy J. Klobucar

(57) ABSTRACT

A grille guard configured to be rotatably attached to a vehicle by a pivot bracket having a first end configured to be attached to a frame of the vehicle and a second end attached to the grille guard. The grille guard is rotatably attached to the frame so as to be movable between an upright configuration where the grille guard extends orthogonally relative to the bumper and a horizontal configuration where the grille guard extends in parallel relative to the bumper. A support assembly including a support member supports the grille guard when the grille guard is in the horizontal configuration.

16 Claims, 10 Drawing Sheets

GRILLE GUARD CONFIGURED TO CONVERT INTO A VEHICLE-MOUNTED BENCH

FIELD

The present disclosure relates to a grille guard that is configured to convert into vehicle-mounted bench.

BACKGROUND

This section provides background information related to the present disclosure which is not necessarily prior art.

It is becoming increasingly common for people to purchase a vehicle having various accessories that aesthetically improve an appearance of the vehicle or increase its functionality. Moreover, it is becoming increasingly common for an owner of a vehicle to separately purchase accessories for the vehicle if the vehicle was originally purchased in a state that did not include the accessories. For example, if the vehicle is a vehicle that can travel off-road, the owner may elect to obtain and install a grille guard that protects the front of the vehicle from impacts that result from using the vehicle off-road. In addition, there is a desire for vehicle accessories to serve more than one purpose.

SUMMARY

This section provides a general summary of the disclosure, and is not a comprehensive disclosure of its full scope or all of its features.

According to a first aspect of the present disclosure, there is provided a grille guard assembly configured to be attached to a vehicle including a frame and a bumper attached to the frame. The grille guard assembly may include a grille guard configured to be rotatably attached to the frame by a pivot bracket having a first end configured to be attached to the frame and a second end attached to the grille guard; and a support assembly configured to be attached to the bumper, wherein the grille guard is rotatably attached to the frame so as to be movable between an upright configuration where the grille guard extends orthogonally relative to the bumper and a horizontal configuration where the grille guard extends in parallel relative to the bumper, and wherein the support assembly includes a support member having a proximate end configured to be attached to the bumper and a distal end configured to mate with the grille guard when the grille guard is in the horizontal configuration.

According to the first aspect, the support member is configured to pivot relative to the bumper between a stowed position and an extended position.

According to the first aspect, the grille guard assembly may further include a clevis bracket that is configured to be attached to the bumper; and a latch pin, wherein the grill guard includes a flange having a first aperture formed therein configured for receipt of the latch pin, and the latch pin is configured to secure the flange to the clevis bracket.

According to the first aspect, the clevis bracket includes a pair of spaced apart and upstanding ears that define a recess configured for receipt of the flange, and each ear has a second aperture configured for receipt of the latch pin.

According to the first aspect, the support assembly includes a mounting bracket configured to be attached to the bumper, and the support member is pivotably attached to the mounting bracket.

According to the first aspect, the grille guard includes a peripheral tube that defines a perimeter of the grille guard, and a plurality of upstanding tubes connected to the peripheral tube.

According to the first aspect, the distal end of the support member includes a hollow semi-cylindrical portion that is configured for receipt of one of the upstanding tubes when the grille guard is in the horizontal configuration.

According to the first aspect, the proximate end of the support member includes a hollow cylinder configured for receipt of a pivot pin that is configured to attach the support member to the bumper.

According to the first aspect, the grille guard assembly may further include a panel configured to mate with the grille guard when the grille guard is in the horizontal position, the panel configured to function as a seat when the grill guard is in the horizontal position.

According to a second aspect of the present disclosure, there is provided a vehicle including a frame; a bumper attached to the frame; a grille guard rotatably attached to the frame by a pivot bracket having a first end attached to the frame and a second end attached to the grille guard; and a support assembly attached to the bumper, wherein the grille guard is rotatably attached to the frame so as to be movable between an upright configuration where the grille guard extends orthogonally relative to the bumper and a horizontal configuration where the grille guard extends in parallel relative to the bumper, and wherein the support assembly includes a support member having a proximate end attached to the bumper and a distal end configured to mate with the grille guard when the grille guard is in the horizontal configuration.

According to the second aspect, the support member is configured to pivot relative to the bumper between a stowed position and an extended position.

According to the second aspect, the vehicle may further include a clevis bracket that is attached to the bumper; and a latch pin, wherein the grill guard includes a flange having a first aperture formed therein configured for receipt of the latch pin, and the latch pin is configured to secure the flange to the clevis bracket.

According to the second aspect, the clevis bracket includes a pair of spaced apart and upstanding ears that define a recess configured for receipt of the flange, and each ear has a second aperture configured for receipt of the latch pin.

According to the second aspect, the support assembly includes a mounting bracket attached to the bumper, and the support member is pivotably attached to the mounting bracket.

According to the second aspect, the grille guard includes a peripheral tube that defines a perimeter of the grille guard, and a plurality of upstanding tubes connected to the peripheral tube.

According to the second aspect, the distal end of the support member includes a hollow semi-cylindrical portion that is configured for receipt of the peripheral tube when the grille guard is in the horizontal configuration.

According to the second aspect, the proximate end of the support member includes a hollow cylinder configured for receipt of a pivot pin that is configured to attach the support member to the bumper.

According to the second aspect, the vehicle may further include a panel configured to mate with the grille guard when the grille guard is in the horizontal position, the panel configured to function as a seat when the grill guard is in the horizontal position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
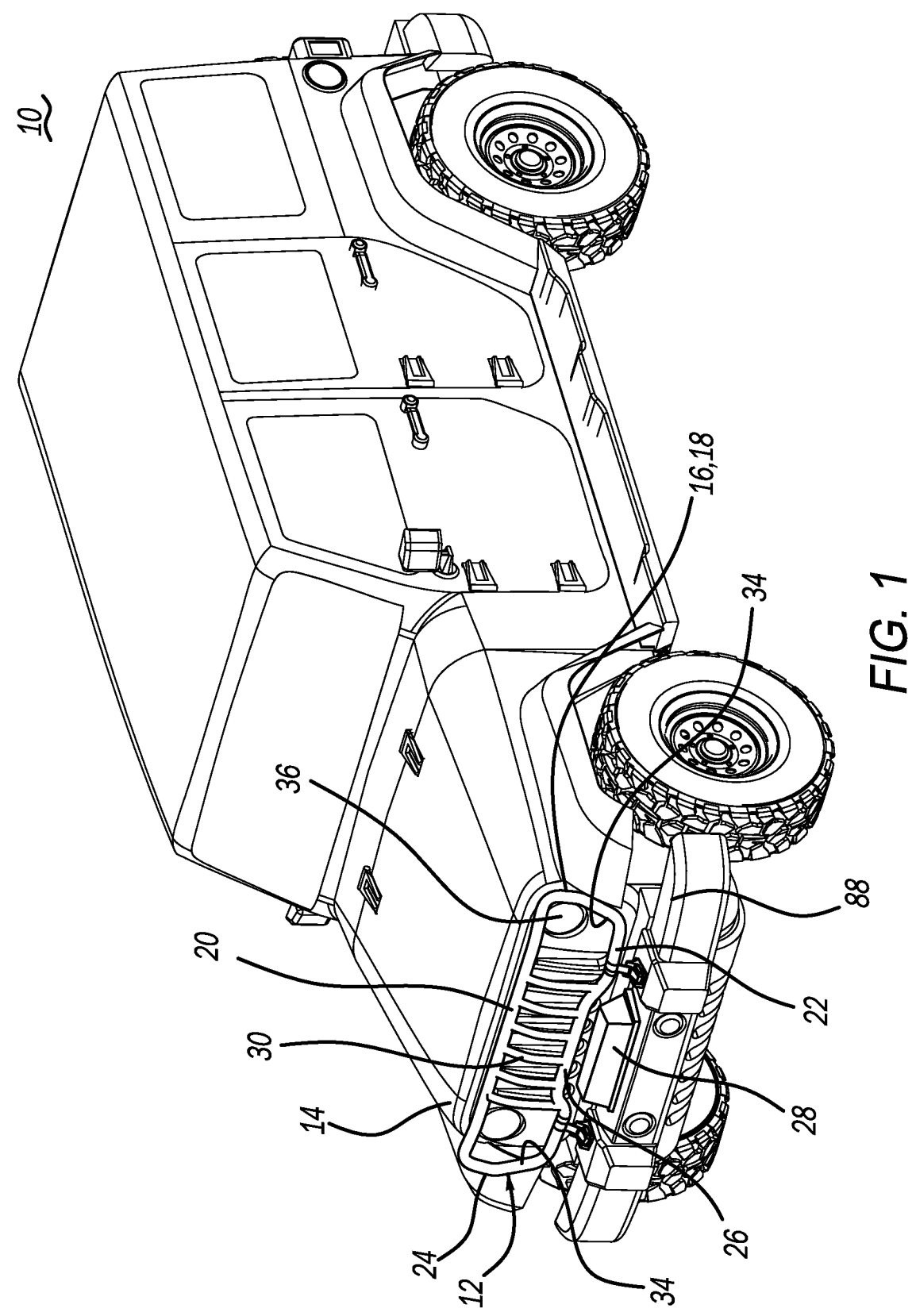
FIG. 1 is a perspective view of a vehicle including a grille guard installed in an upright condition.

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
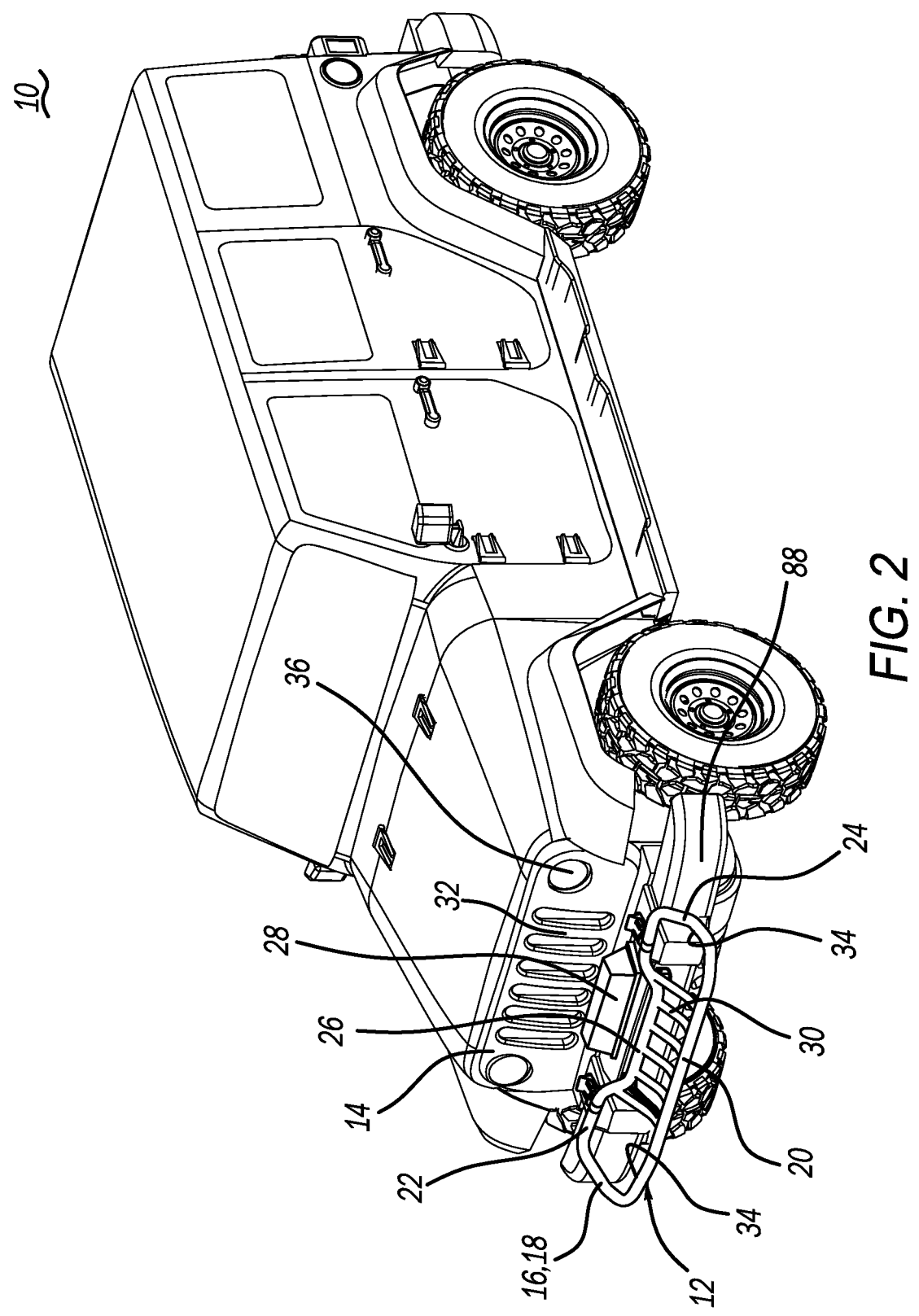
FIG. 2 is a perspective view of a vehicle including the grille guard shown in FIG. 1 pivoted to a horizontal (bench) condition.

FIGS. 1 and 2 illustrate a vehicle 10 having a grille guard 12 attached thereto. FIG. 1 illustrates grille guard 12 in a conventional upright configuration where grille guard 12 is configured to protect a front 14 of vehicle 10 in the event that vehicle 10 is struck by, for example, a branch of a tree or shrub, debris that may be deflected by another vehicle on the roadway, or other objects that may collide with vehicle 10. FIG. 2 illustrates vehicle 10 when grille guard 12 in a horizontal configuration. When grille guard 12 is in the horizontal configuration, the grille guard 12 may be used as a bench for someone to sit.

Grille guard 12 may be formed of a rigid metal material such as steel, aluminum, or any other rigid material (e.g., metal alloys) known to one skilled in the art. In the illustrated embodiment, grille guard 12 includes peripheral tube 16 that defines an outer perimeter 18 of grille guard 12. Peripheral tube 16 includes an upper section 20 that extends substantially linearly, a lower section 22, and a pair of side sections 24 that connect upper section 20 to lower section 22. Lower section 22 may include a recessed section 26 to provide clearance for optional features of the vehicle 10 such as, for example, a winch 28. It should be understood, however, that lower section 22 may be substantially similar to upper section 20 (i.e., extend substantially linearly) without departing from the scope of the present disclosure.

Grille guard 12 also includes a plurality of upstanding tubes 30 that extend between upper section 20 and lower section 22, where upstanding tubes 30 are arranged to correspond to a grille 32 of vehicle 10. In addition, upstanding tubes 30 in conjunction with upper section 20, lower section 22, and side sections 24 define a pair of openings 34 that do not obstruct headlamps 36 of vehicle 10. As will be described in more detail later, openings 34 may also be configured for receipt of a panel 38 that can used as a seat when grille guard 12 is in the horizontal (bench) configuration.

Figure 3:
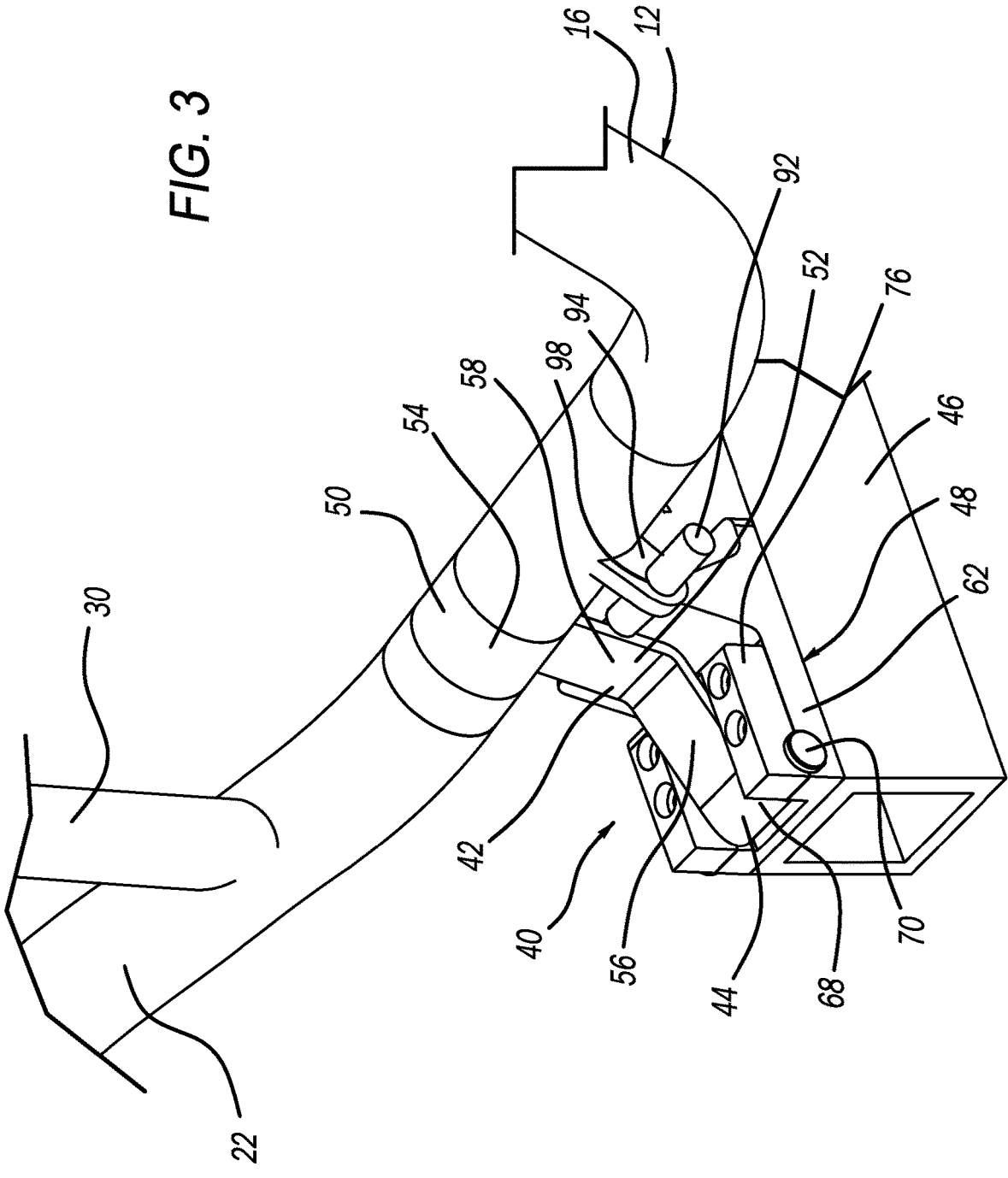
FIG. 3 is a perspective view of a pivot bracket assembly that permits the grille guard shown in FIGS. 1 and 2 to move between the upright and horizontal conditions.
Figure 4:
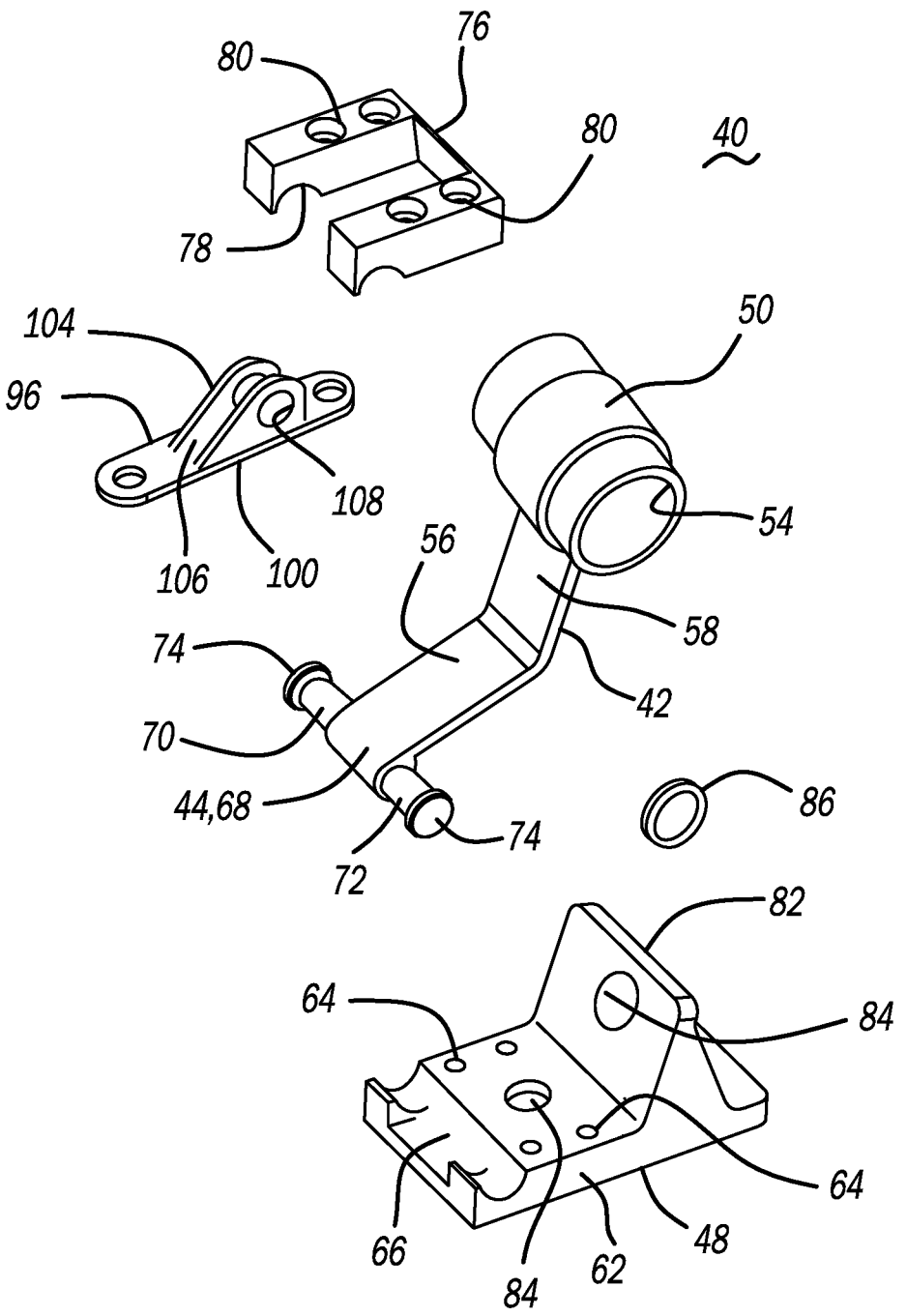
FIG. 4 is an exploded perspective view of the pivot bracket assembly illustrated in FIG. 3.
Figure 5:
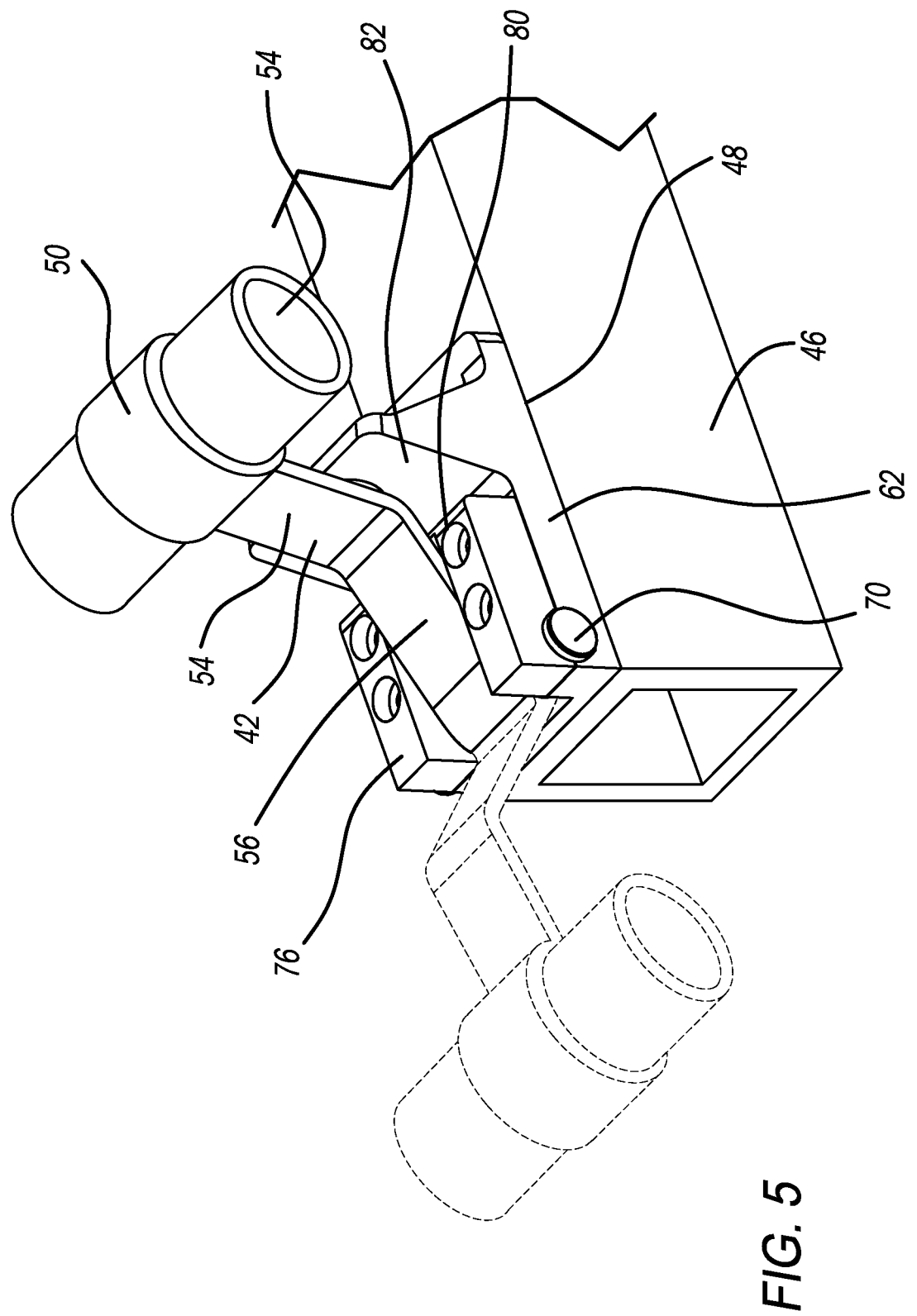
FIG. 5 is a perspective view of the pivot bracket assembly illustrated in FIG. 4 attached to a frame of the vehicle, and illustrating how the pivot bracket pivots between the upright and horizontal conditions.

Now referring to FIGS. 3-5, and with continued reference to FIGS. 1 and 2, grille guard 12 is pivotably attached to vehicle 10 by a pair of pivot bracket assemblies 40. Pivot bracket assemblies 40 each include a gooseneck hinge 42 that may be formed of a rigid metal material such as steel, and that includes a first end 44 that is attached to a frame 46 of vehicle 10 via a hinge base clamp 48, an opposite second end 50 that is attached to grille guard 12. An arm 52 extends between first end 44 and second end 50. Second end 50 defines a first cylindrical tube 54 that is configured for receipt of lower section 22 of grille guard 12. Arm 52 includes a first section 56 and a second section 58. First section 56 extends between first end 44 that is connected to frame 46 and second section 58. Second section 58 is unitary with first section 56 and is angled relative to first section 56.

As noted above, gooseneck hinge 42 is attached to vehicle frame 46 via hinge base clamp 48. Hinge base clamp 48 is attached to vehicle frame 46 via plurality of fasteners (not shown). Hinge base clamp 48 includes a base 62 having a plurality of apertures 64 configured to permit fasteners (not shown) to pass therethrough and either threadingly engage with apertures (not shown) formed in frame 46 or pass through the apertures (not shown) formed in frame 46 and threadingly engage with a nut (not shown). Base 62 includes a first elongated recess 66 configured for receipt of first end 44 of gooseneck hinge 42. In this regard, first end 44 of gooseneck hinge 42 defines a second cylindrical tube 68 that is configured for receipt of a pivot pin 70 having a shank 72 and a pair of heads 74.

When first end 44 and pivot pin 70 are seated in first elongated recess 66, first end 44 and pivot pin 70 is clamped to hinge base clamp 48 using a hinge clamp cap 76 that includes a correspondingly shaped second elongated recess 78 that is configured for receipt of first end 44 of gooseneck hinge 42. Similar to hinge base clamp 48, hinge clamp cap 76 includes apertures 80 configured for receipt of fasteners (not shown) that fix hinge clamp cap 76 to hinge base clamp 48. When gooseneck hinge 42 is clamped between hinge clamp cap 76 and hinge base clamp 48, gooseneck hinge 42 is configured to pivot about pivot pin 70 and move grille guard 12 between the upright and horizontal configurations (FIG. 5).

Hinge base clamp 48 includes an outwardly extending flange 82. When grille guard 12 is in the upright condition (see, e.g., FIGS. 1, 3, and 5), second section 58 of gooseneck hinge 42 is configured to rest against flange 82. Flange 82 may include a circular recess 84 (FIG. 4) that is configured for receipt of a bumper stop 86. Bumper stop 86 configured to dampen vibrations experienced between gooseneck hinge 42 and flange 82 when grille guard 12 is in the upright configuration and during operation of vehicle 10. A similar recess 84 and bumper stop 86 may be provided in base 62.

Figure 6:
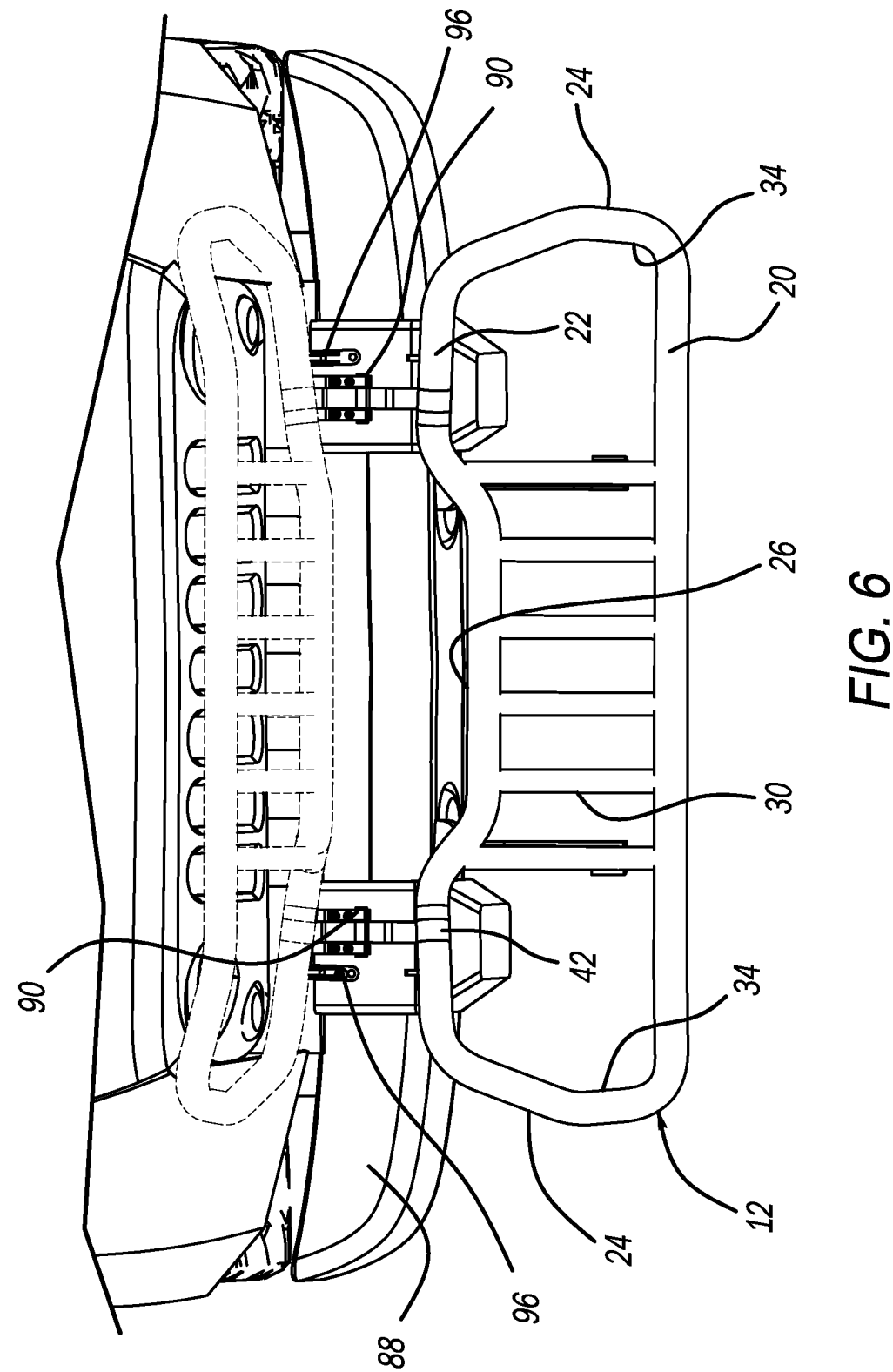
FIG. 6 is a front perspective view of the grille guard assembly when attached to the vehicle, and showing the upright and horizontal conditions.
Figure 7:
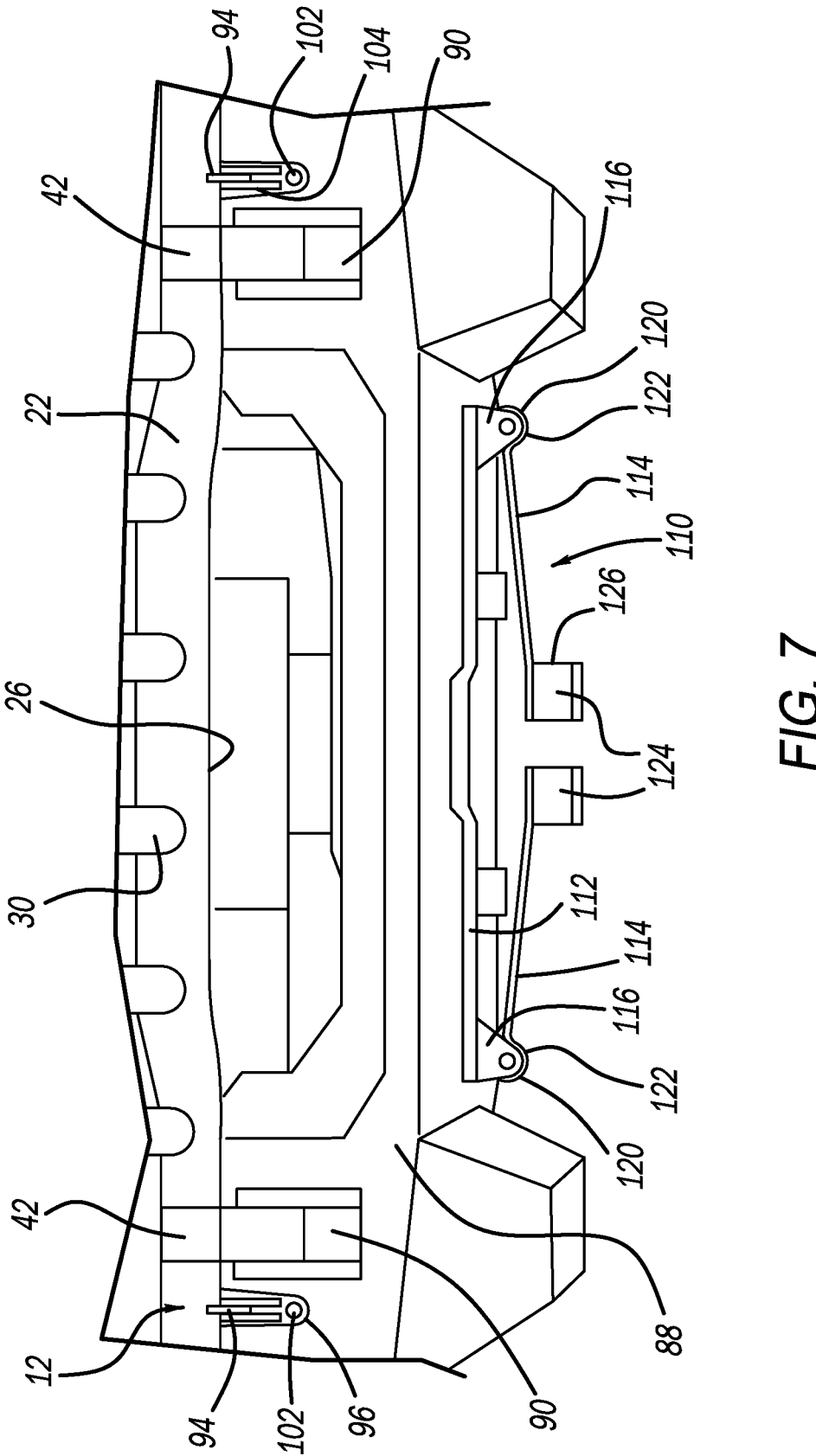
FIG. 7 is a perspective view of a support assembly that supports the grille guard when in the horizontal condition, in a stowed configuration.

As best shown in FIGS. 6 and 7, to permit gooseneck hinge 42 to pivot relative to vehicle 10, a bumper 88 that is attached to frame 46 of vehicle 10 includes apertures 90 that are configured for receipt of gooseneck hinges 42, and permit gooseneck hinges 42 and grille guard 12 to move between the upright (FIG. 1) and horizontal (FIG. 2) configurations.

Referring to FIGS. 3 and 7, when grille guard 12 is in the upright configuration, grille guard 12 may be held in the upright configuration using a latch pin 92 (see FIG. 3). More specifically, lower section 22 of grille guard 12 may include a pair of flanges 94 that are configured to mate with a clevis bracket 96 (best shown in FIG. 4) that is fixed to bumper 88. Flanges 94 include an opening 98 configured for receipt of latch pin 92. Clevis brackets 96 include a base 100 that is fixed to bumper 88 using a pair of fasteners 102 (e.g., bolts), of which only one is shown in FIG. 7. A pair of upstanding and spaced apart ears 104 extend outward from base 100 and define a recess 106 that is configured for receipt of flange 94. Similar to flange 94, ears 104 include an opening 108 configured for receipt of latch pin 92. Thus, when flange 94 is located in recess 106 and openings 98, 108 are aligned, latch pin 92 may be inserted through openings 98, 108 to retain grille guard 12 in the upright configuration. Of course, removal of latch pin 92 permits grille guard 12 to pivot away from the front 14 of vehicle 10 using pivot bracket assemblies 40.

Figure 8:
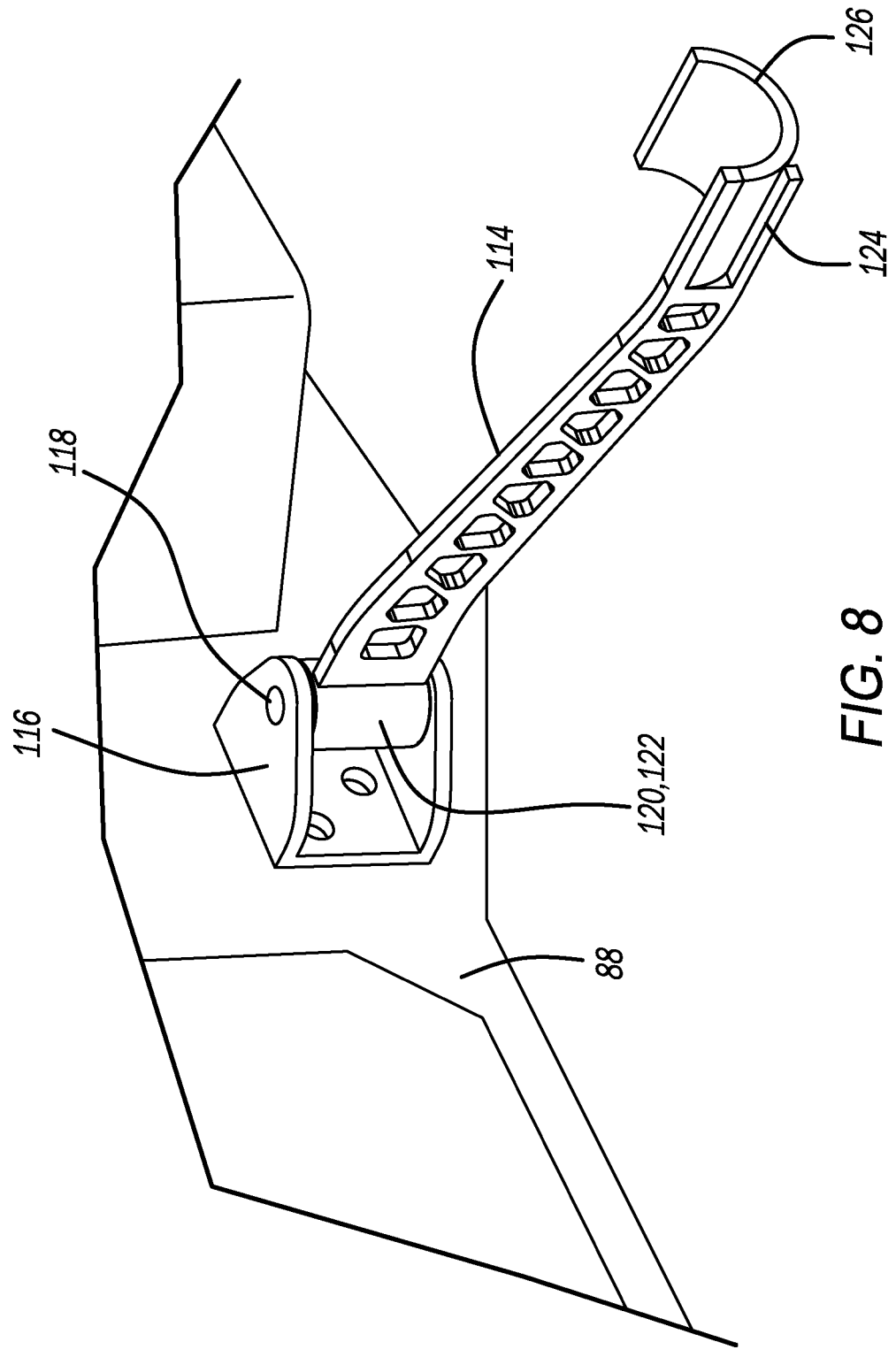
FIG. 8 is a perspective view of one of the support arms of the support assembly illustrated in FIG. 7, in an extended configuration.

Still referring to FIG. 7, when grille guard 12 is in the horizontal (bench) configuration, it may be necessary to provide support to grille guard 12. Vehicle 10, therefore, may include a support assembly 110 attached to bumper 88. Support assembly 100 includes a mounting bracket 112 fixed to bumper 88 and a pair of support members 114 pivotably connected to mounting bracket 112. Mounting bracket 112 and support members 114 may each be formed of a rigid metal material such as steel or aluminum. Mounting bracket 112 may be attached to bumper 88 using fasteners (not shown), and includes two pairs of ears 116 that are configured for receipt of a pivot pin 118 and pivot end 120 of support members 114 (FIG. 8). It should be understood that support assembly 110 does not necessarily require mounting bracket 112. In this regard, in lieu of mounting bracket 112, bumper 88 may be formed to include ears 116 and support members 114 can be attached directly to bumper 88 (see, e.g., FIG. 8).

Pivot pin 118 permits support member 114 to pivot relative to mounting bracket 112 and bumper 88 from a stowed position where support members 114 are pivoted in a direction toward each other (see, e.g., FIG. 7) and extend substantially in parallel with bumper 88, to an extended position (FIG. 8) where support members 114 extend substantially orthogonal to bumper 88. As noted above, support members 114 include a pivot end 120 that is defined by a hollow cylinder 122 configured for receipt of pivot pin 118. Support member 114 also includes a support end 124 defined by a hollow semi-cylindrical portion 126 that is configured for receipt of one of the upstanding tubes 30 therein.

To rotate grille guard 12 to the horizontal (bench) configuration, latch pins 92 are disengaged from clevis bracket 96 and flange 94, and support members 114 are rotated in a direction away from bumper 88. Then, grille guard 12 may be gasped and rotated away from the front 14 of vehicle 10. Semi-cylindrical portions 126 may then be aligned with upstanding tubes 30 and mated therewith. At this time, grille guard 12 may be used as a bench seat. One may sit on upper section 20 or upon upstanding tubes 30. Alternatively, after grille guard 12 is converted to a bench seat as noted above, a separate panel 38 may be mated with grill guard 12. An example panel 38 is illustrated in FIGS. 9 and 10.

Figure 9:
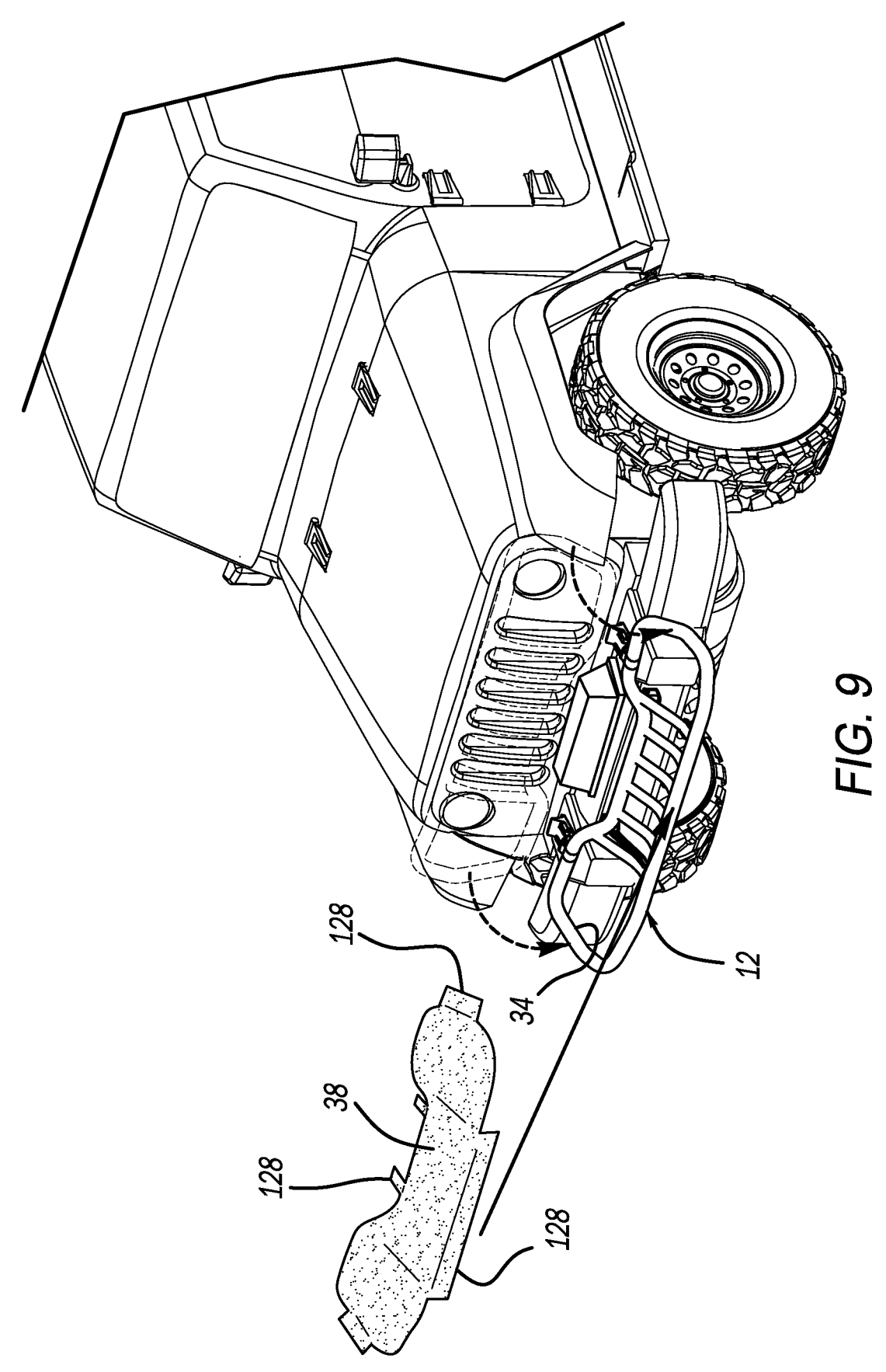
FIGS. 9 and 10 illustrate the use of a panel that can serve as a seat when the grille guard is in the horizontal (bench) condition.
Figure 10:
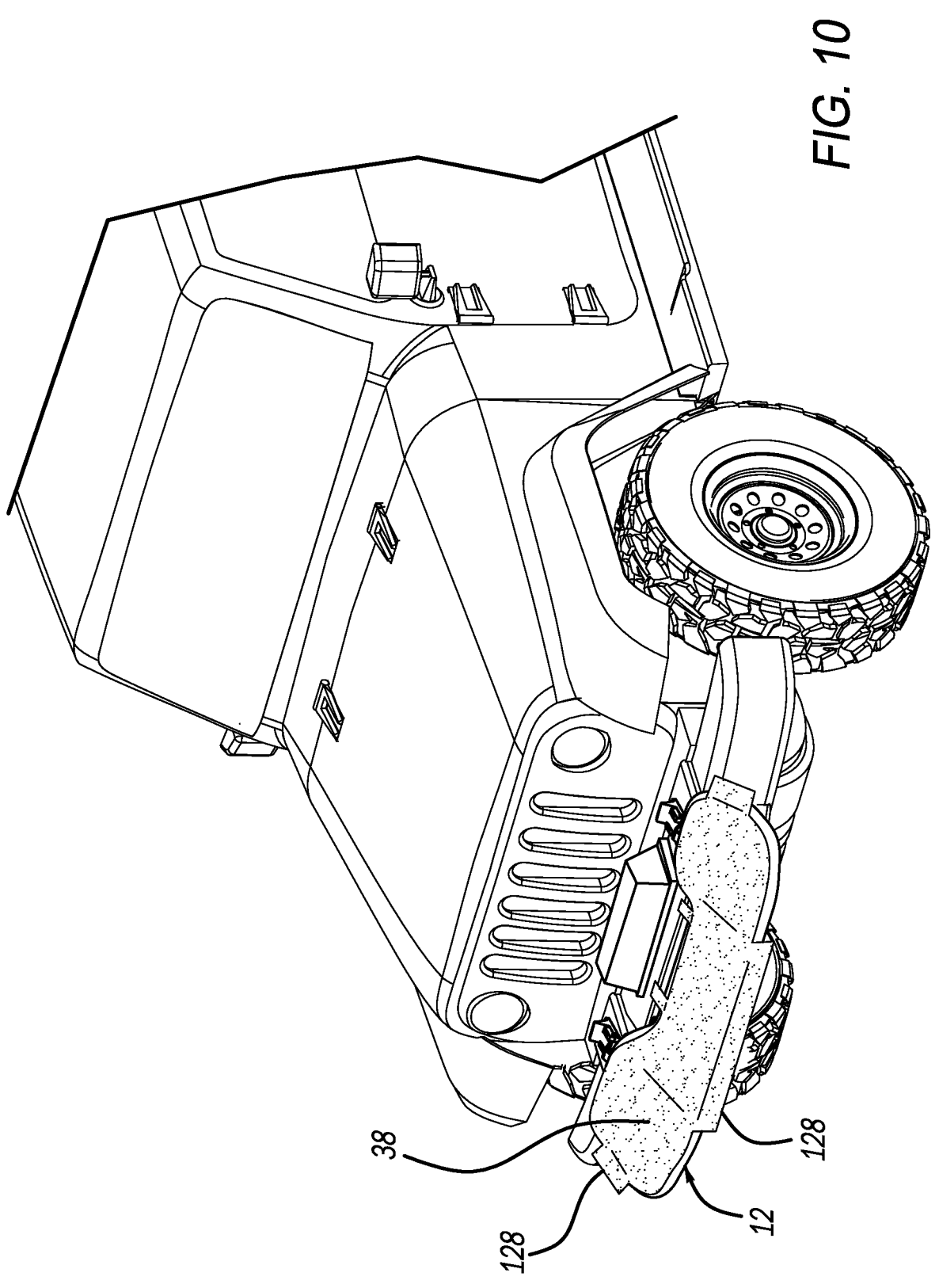

In FIG. 9, panel 38 may extend along an entire length of grille guard 12. In the illustrated example, panel 38 may include mating features 128 along edges thereof that are configured for receipt of peripheral tube 16. Panel 38 may be ergonomically contoured to provide a comfortable seating area for grille guard 12. Alternatively, grille guard 12 may be configured for receipt of a pair of panels 38 (not shown). In such a case, the panels 38 may be configured to be received by openings 34 of grille guard 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grille guard assembly configured to be attached to a vehicle including a frame and a bumper attached to the frame, comprising:

a grille guard configured to be rotatably attached to the frame by a pivot bracket having a first end configured to be attached to the frame and a second end attached to the grille guard;

a support assembly configured to be attached to the bumper;

a clevis bracket that is configured to be attached to the bumper; and a latch pin, wherein the grille guard is rotatably attached to the frame so as to be movable between an upright configuration where the grille guard extends orthogonally relative to the bumper and a horizontal configuration where the grille guard extends in parallel relative to the bumper, wherein the support assembly includes a support member having a proximate end configured to be attached to the bumper and a distal end configured to mate with the grille guard when the grille guard is in the horizontal configuration, and wherein the grille guard includes a flange having a first aperture formed therein configured for receipt of the latch pin, and the latch pin is configured to secure the flange to the clevis bracket.

2. The grille guard assembly according to claim 1, wherein the support member is configured to pivot relative to the bumper between a stowed position and an extended position.

3. The grille guard assembly according to claim 1, wherein the clevis bracket includes a pair of spaced apart and upstanding ears that define a recess configured for receipt of the flange, and each ear has a second aperture configured for receipt of the latch pin.

4. The grille guard assembly according to claim 1, wherein the support assembly includes a mounting bracket configured to be attached to the bumper, and the support member is pivotably attached to the mounting bracket.

5. The grille guard assembly according to claim 1, wherein the grille guard includes a peripheral tube that defines a perimeter of the grille guard, and a plurality of upstanding tubes connected to the peripheral tube.

6. The grille guard assembly according to claim 5, wherein the distal end of the support member includes a hollow semi-cylindrical portion that is configured for receipt of one of the upstanding tubes when the grille guard is in the horizontal configuration.

7. The grille guard assembly according to claim 1, wherein the proximate end of the support member includes a hollow cylinder configured for receipt of a pivot pin that is configured to attach the support member to the bumper.

8. The grille guard assembly according to claim 1, further comprising a panel configured to mate with the grille guard when the grille guard is in the horizontal position, the panel configured to function as a seat when the grille guard is in the horizontal position.

9. A vehicle, comprising:

a frame;

a bumper attached to the frame;

a grille guard rotatably attached to the frame by a pivot bracket having a first end attached to the frame and a second end attached to the grille guard;

a support assembly attached to the bumper; and a panel configured to mate with the grille guard, wherein the grille guard is rotatably attached to the frame so as to be movable between an upright configuration where the grille guard extends orthogonally relative to the bumper and a horizontal configuration where the grille guard extends in parallel relative to the bumper, wherein the support assembly includes a support member having a proximate end attached to the bumper and a distal end configured to mate with the grille guard when the grille guard is in the horizontal configuration, and wherein the panel is configured to mate with the grille guard and function as a seat when the grille guard is in the horizontal position.

10. The vehicle according to claim 9, wherein the support member is configured to pivot relative to the bumper between a stowed position and an extended position.

11. The vehicle according to claim 9, further comprising a clevis bracket that is attached to the bumper; and a latch pin, wherein the grille guard includes a flange having a first aperture formed therein configured for receipt of the latch pin, and the latch pin is configured to secure the flange to the clevis bracket.

12. The vehicle according to claim 11, wherein the clevis bracket includes a pair of spaced apart and upstanding ears that define a recess configured for receipt of the flange, and each ear has a second aperture configured for receipt of the latch pin.

13. The vehicle according to claim 9, wherein the support assembly includes a mounting bracket attached to the bumper, and the support member is pivotably attached to the mounting bracket.

14. The vehicle according to claim 9, wherein the grille guard includes a peripheral tube that defines a perimeter of the grille guard, and a plurality of upstanding tubes connected to the peripheral tube.

15. The vehicle according to claim 14, wherein the distal end of the support member includes a hollow semi-cylindrical portion that is configured for receipt of the peripheral tube when the grille guard is in the horizontal configuration.

16. The vehicle according to claim 9, wherein the proximate end of the support member includes a hollow cylinder configured for receipt of a pivot pin that is configured to attach the support member to the bumper.

* * * * *